(12) United States Patent
McNeil et al.

(10) Patent No.: US 11,441,604 B1
(45) Date of Patent: *Sep. 13, 2022

(54) RAPID MOVEMENT LOADER SLOT BEARING SUITABLE FOR USE ON MUNITIONS DEPLOYMENT STRUCTURES

(71) Applicant: Roller Bearing Company of America, Inc., Oxford, CT (US)

(72) Inventors: Scott McNeil, Gilford, NH (US); Ben Anderson, Scarsdale, NY (US); Jackson Sarneski-Hayes, Fairfield, CT (US)

(73) Assignee: Roller Bearing Company of America, Inc., Oxford, CT (US)

( * ) Notice: Subject to any disclaimer, the term of this patent is extended or adjusted under 35 U.S.C. 154(b) by 80 days.

This patent is subject to a terminal disclaimer.

(21) Appl. No.: 17/002,050

(22) Filed: Aug. 25, 2020

Related U.S. Application Data (63) Continuation of application No. 15/998,157, filed on Jul. 10, 2018, now Pat. No. 10,788,073.

(60) Provisional application No. 62/604,544, filed on Jul. 11, 2017.

(51) Int. Cl.
*F16C 23/04* (2006.01)

(52) U.S. Cl.
CPC ................. *F16C 23/045* (2013.01)

(58) Field of Classification Search
CPC ... F16C 11/06; F16C 11/0623; F16C 11/0628; F16C 11/068; F16C 11/0685; F16C 23/043; F16C 23/045; F16C 25/04
See application file for complete search history.

(56) References Cited

U.S. PATENT DOCUMENTS

| 5,752,774 A | 5/1998 | Heshmat et al. |
| 7,568,841 B2 | 8/2009 | Wood, Jr. et al. |
| 8,876,390 B2 | 11/2014 | McNeil |

(Continued)

FOREIGN PATENT DOCUMENTS

| WO | 2013090758 A1 | 6/2013 |
| WO | 2014021958 A1 | 2/2014 |
| WO | 2018102183 A1 | 6/2018 |

OTHER PUBLICATIONS

Affidavit under 37 CFR § 1.132 of Scott McNeil, signed Feb. 24, 2020.

(Continued)

*Primary Examiner* — James Pilkington
(74) *Attorney, Agent, or Firm* — Murtha Cullina LLP (57) ABSTRACT

A loader slot bearing includes an annular housing having first and second axial surfaces and an interior area extending therebetween. The interior area has a first inner surface that extends between the first and second axial surfaces. A portion of the inner surface is a first bearing surface that has a spherical contour. A slot extends partially into the first inner surface from the first axial surface. The slot has a first width. The annular housing is manufactured from a precipitation hardened corrosion resistant stainless steel. The loader slot bearing includes a truncated ball that is positioned in the slot and rotated so that the truncated ball is rotatably retained by the first bearing surface. The truncated ball is angularly misalignable relative to the housing and is manufactured from a 440C stainless steel. A dry lubricant is applied to the spherical exterior surface of the truncated ball.

17 Claims, 9 Drawing Sheets

(56) References Cited

U.S. PATENT DOCUMENTS

| | | | |
|---|---|---|---|
| 10,788,073 B1* | 9/2020 | McNeil | F16C 23/045 |
| 2008/0040866 A1 | 2/2008 | Arnold et al. | |
| 2011/0142532 A1 | 6/2011 | Diemirbey | |
| 2014/0294484 A1 | 10/2014 | Nunn et al. | |

OTHER PUBLICATIONS

Affidavit Exhibit 1—Redacted customer purchase order for standard bearing, dated Oct. 2, 2014.
Affidavit Exhibit 2—Redacted marked up drawing, with annotations dated Apr. 7, 2015.
Affidavit Exhibit 3—Redacted NDA between RBC and a customer, signed Sep. 25, 2014.
Affidavit Exhibit 4—Redacted RBC email to a customer with specifications of the bearing and confidential offer for sale, dated Apr. 7, 2015.
Affidavit Exhibit 5—Confidential offer for sale, dated Apr. 24, 2015.
Affidavit Exhibit 6—Confidential Purchase Order for samples, dated Apr. 27, 2015.
Affidavit Exhibit 7—Confidential Purchase Order 439135, dated Jul. 20, 2015.
Affidavit Exhibit 8—Invoice for Purchase Order 439135, dated Aug. 28, 2015.
Affidavit Exhibit 9—Confidential Purchase Order 456059, dated Mar. 17, 2016.
Affidavit Exhibit 10—Invoice for Purchase Order 456059, dated Mar. 29, 2016.
Affidavit Exhibit 11—Redacted NDA between RBC and a customer, signed Sep. 26, 2014.
Affidavit Exhibit 12—Confidential offer for sale, dated Aug. 31, 2015.
Affidavit Exhibit 13—Status of SBD II project, dated Mar. 23, 2016.
Affidavit under 37 CFR § 1.132 of Scott McNeil, signed Aug. 26, 2020.
Spherical Bearings Loader Slot Bearings Rod End Bearings Sleeve Bearings, Astro Division Products and Engineering, NHBB, New Hampshire Ball Bearings, Inc., 2014, pp. 1-91.
RBC Aerospace Bearings, Plain Bearings, Unique Design Solutions to Complex Problems, 2008 RBC Bearings Incorporated, pp. 1-112, p. 78.
RBC Aerospace Bearings, Plain Bearings, Unique Design Solutions to Complex Problems, 2008, 2011, 2016 RBC Bearings Incorporated, pp. 1-107, p. 72.

\* cited by examiner

RAPID MOVEMENT LOADER SLOT BEARING SUITABLE FOR USE ON MUNITIONS DEPLOYMENT STRUCTURES

CROSS REFERENCE TO RELATED APPLICATION

The instant application is a continuation application of and claims priority benefit to U.S. application Ser. No. 15/998,157, entitled "RAPID MOVEMENT LOADER SLOT BEARING SUITABLE FOR USE ON MUNITIONS DEPLOYMENT STRUCTURES," filed on Jul. 10, 2018, which is a non-provisional application of, and claims priority benefit to, U.S. Provisional Patent Application No. 62/604,544, entitled "RAPID MOVEMENT LOADER SLOT BEARING SUITABLE FOR USE ON MUNITIONS DEPLOYMENT STRUCTURES," filed on Jul. 11, 2017, the entirety of which is incorporated by reference herein.

TECHNICAL FIELD

The present disclosure relates generally to a rod end having a loader slot spherical bearing therein that has a housing manufactured from a precipitation hardened stainless steel alloy, a truncated spherical ball made from a 440C stainless steel positioned partially in the housing and having a dry lubricant applied to an exterior surface thereof, and more particularly the rod end is employed for rapid deployment flight control surfaces and/or antennae and/or sensors of munitions (e.g., smart bombs and guided missiles) deployed from unmanned and manned aircraft (e.g., drones) having to be stored and operated in harsh environments.

BACKGROUND OF THE INVENTION

Figure 1:
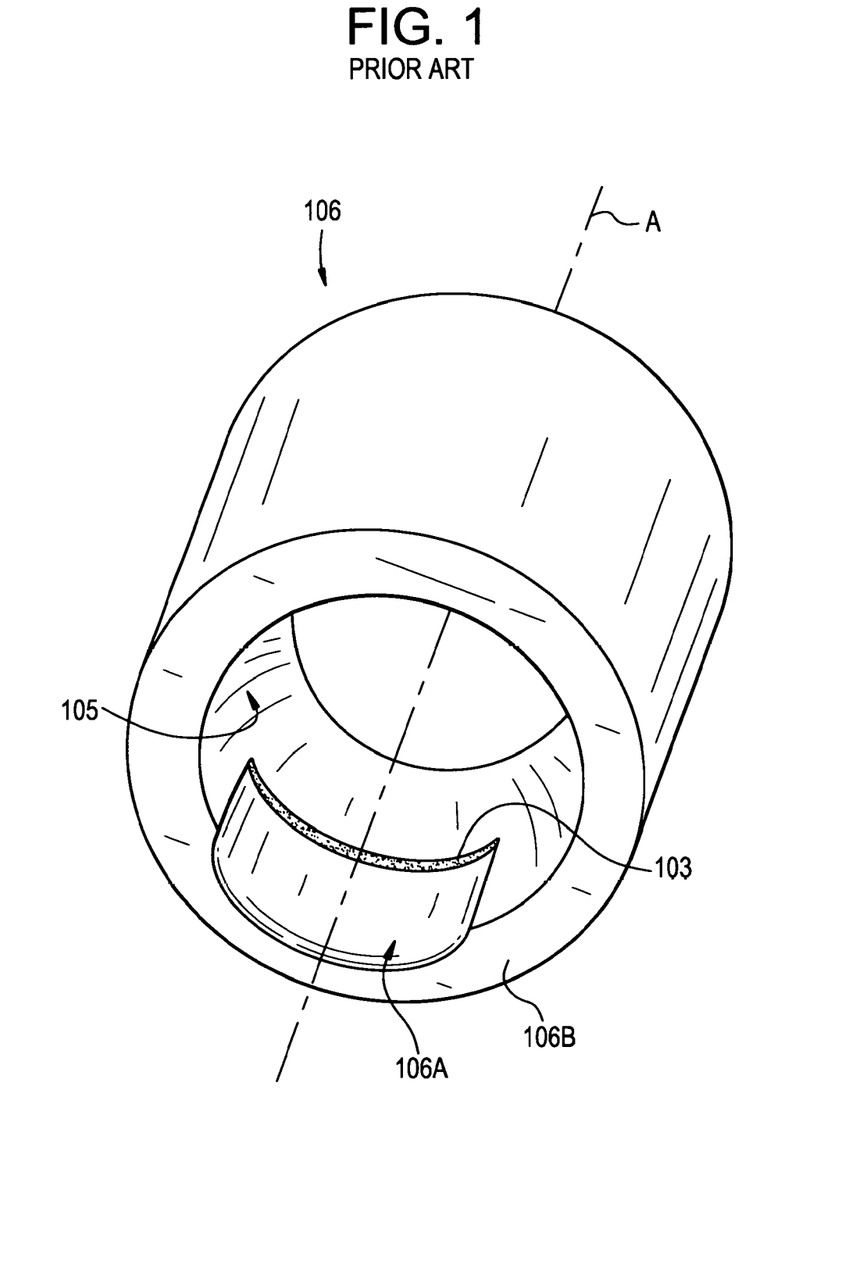
FIG. 1 is a perspective view of a housing of a prior art loader slot bearing illustrating a damaged area caused at high loading of the prior art loader slot bearing.
Figure 2:
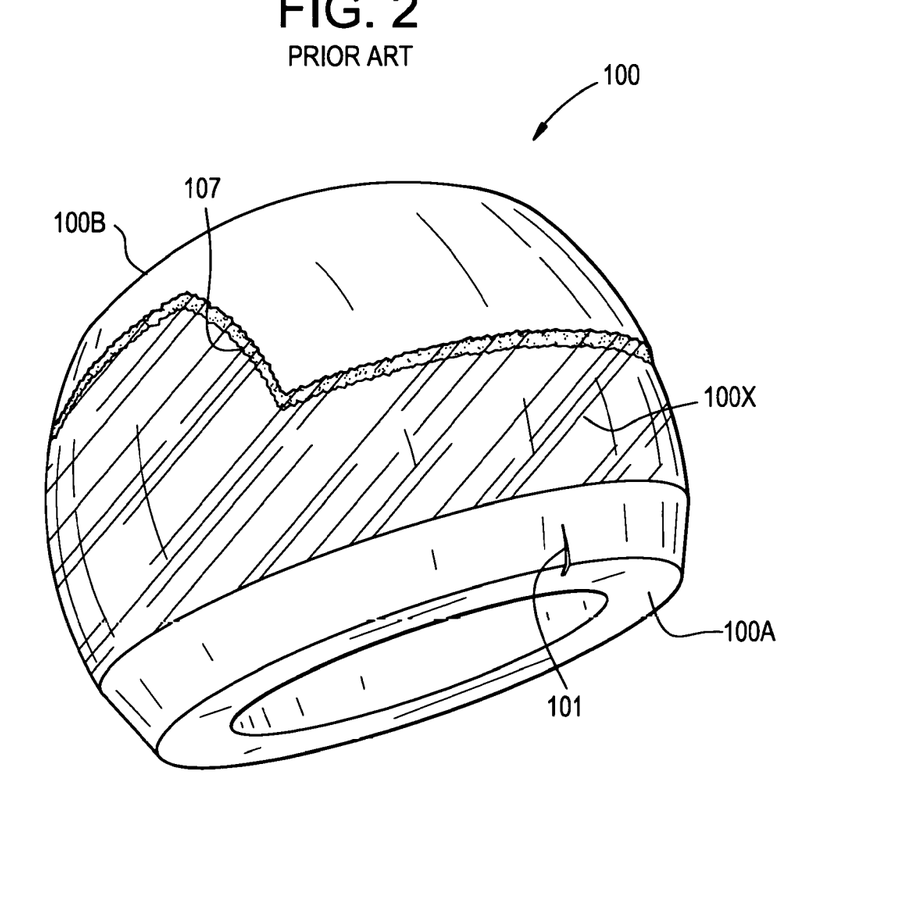
FIG. 2 is a perspective view of a cobalt 6 ball of a prior art loader slot bearing illustrating damage after high loading of the prior art loader slot bearing.

As shown in FIG. 1, slot loader bearings typically have a steel housing 106 or outer member that has a slot 106A extending partially into one axial surface 106B of the housing 106. As shown in FIG. 2, a truncated ball 100 that has a spherical exterior surface 100X that extends between opposing axial surfaces 100A and 100B of the truncated ball 100, is disposed in the slot 106A and rotated into place in the housing 106. Slot loader bearings can be employed in various aircraft applications. Typically, the prior art slot loader bearings have housings 106 that have inner surfaces 105 thereof coated via a case hardening treatment such as a malcomizing process (e.g., nitriding) or LINTRIDE SS (LINTRIDE SS is a registered trademark of Lindberg Corporation, 6133 N. River Road Suite 700 Rosemont, Ill. 60018) to case harden the inner surface to a hardness of 64 to 68 Rockwell C. In the malcomization process, nascent (i.e., monatomic) nitrogen (N+) is adsorbed at the inner surface 105 and absorbed (diffused via dislocation vacancies) into the steel, combining with nitride forming elements such as molybdenum, chromium and vanadium to form nitrides.

Prior art slot loader bearings typically employ a truncated ball 100 manufactured from an investment cast Cobalt 6 alloy per AMS5387, such as Stellite® 6C (STELLITE is a registered trademark of Kennametal Inc. of 1600 Technology Way, Latrobe, Pa.) having a hardness of 36 to 45 Rockwell C. However, such cobalt based balls 100 have elongation (toughness) properties of less than 1%. As a result, such cobalt balls 100 tend to develop cracks 101 and fracture when subject to impact loads or relatively small strain displacements. See for example, FIG. 2. In some instances a pin is inserted through the ball 100 and a loose pin can cause a STELLITE®6C or Cobalt 6 ball per AMS5387, to crack under tension or compressive loads.

In addition, sliding engagement between the truncated ball 100 and the malcomized inner surface 105 of the housing 106 can cause a Brinelling mark 107 (i.e., permanent indentation of a hard surface) caused by imprint of the entry slot on the Stellite® 6 or Cobalt 6 ball 100 which has a lesser hardness than that of the malcomized inner surface 105, as shown in FIG. 2, which causes bearing binding of movement and possibly seizure of movement of the ball 100 relative to the housing 106. Moreover, the malcomized inner surface 105 can shear off at the entry slot 103 due to the sliding engagement and impact loads between the ball 100 and the housing 106. The fractured remnants of the malcomized surface that break off are very susceptible to corrosion and can cause further bearing damage, possibly seizing the ball 100.

Thus, there is a need for an improved slot loader bearing that overcomes the foregoing problems.

SUMMARY OF THE INVENTION

According to aspects illustrated herein, there is provided a loader slot bearing that includes an annular housing that has a first axial surface, a second axial surface and an interior area extending between the first axial surface and the second axial surface. The interior area is defined by a first inner surface that extends between the first axial surface and the second axial surface. A portion of the inner surface is a first bearing surface that has a spherical contour. A slot extends partially into the first inner surface from the first axial surface. The slot has a first width. The annular housing is manufactured from a precipitation hardened corrosion resistant stainless steel. The loader slot bearing includes a truncated ball that has a spherical exterior surface extending a second width between a third axial surface and a fourth axial surface. The second width is less than the first width. The truncated ball is positioned in the slot and rotated so that the truncated ball is rotatably retained by the first bearing surface. The truncated ball is angularly misalignable relative to the housing. The truncated ball is manufactured from a 440C stainless steel per AMS 5630. A dry lubricant (e.g., a molybdenum disulfide material in a binder) is applied to the spherical exterior surface.

In one embodiment, the precipitation hardened corrosion resistant stainless steel is 17-4PH stainless steel pursuant to AMS 5643. In one embodiment, the 17-4PH stainless steel is in a condition H1150 heat treatment.

In one embodiment, the precipitation hardened corrosion resistant stainless steel is 15-5PH stainless steel pursuant to AMS5659.

In one embodiment, the precipitation hardened corrosion resistant stainless steel has a surface hardness of 28 to 37 Rockwell C.

In one embodiment, the truncated ball has a surface hardness of 55 to 62 Rockwell C.

In one embodiment, the truncated ball has a cylindrical bore extending between the third axial surface and the fourth axial surface. The bore is defined by a second inner surface. A pin that has a cylindrical exterior surface extends through the cylindrical bore. The truncated ball is axially rotatable relative to the pin when frictional forces between the second inner surface and the cylindrical exterior surface is below a threshold level and when the frictional forces exceed the threshold level, the pin and truncated ball lock together and are axially rotatable together, relative to the housing. In one embodiment, the pin is solid.

In one embodiment, the cylindrical exterior surface defines a first outside diameter and the bore of the truncated ball has a first inside diameter that is at least 0.00254 to 0.04826 mm (0.0001 to 0.0019 inches) greater than the first outside diameter.

In one embodiment, the dry film lubricant facilitates direct sliding engagement of the spherical exterior surface with the first bearing surface. In one embodiment, the dry lubricant is of a maximum thickness of 0.0127 mm (0.0005 inches).

In one embodiment, the spherical exterior surface of the truncated ball is defined by a second outside diameter. In one embodiment, the housing and the truncated ball are configured to move relative to one another and withstand accelerations of up to about 4G and/or the housing, the truncated ball and the pin are configured to move relative to one another and withstand accelerations such as those due to impact or shock loads of up to about 4G, created by rapid deployment coming to an abrupt hard stop.

In one embodiment, a shaft extends from and is integral with the annular housing thereby forming a rod end. In one embodiment, the shaft is integral with a support frame or is secured to the support frame with at least one fastener.

In one embodiment, the loader slot bearing has one or more dampening features, configured to dampen impact loads received by the loader slot bearing.

In one embodiment, the loader slot bearing and/or the rod end is manufactured from a bar stock or cast form of the precipitation hardened corrosion resistant stainless steel.

In one embodiment, the truncated ball is dropped in or forced fit in to the interior area of the housing.

Any of the foregoing embodiments may be combined.

BRIEF DESCRIPTION OF THE DRAWING

Referring now to the Figures, which are exemplary embodiments, and wherein the like elements are numbered alike.

DETAILED DESCRIPTION

Figure 3:
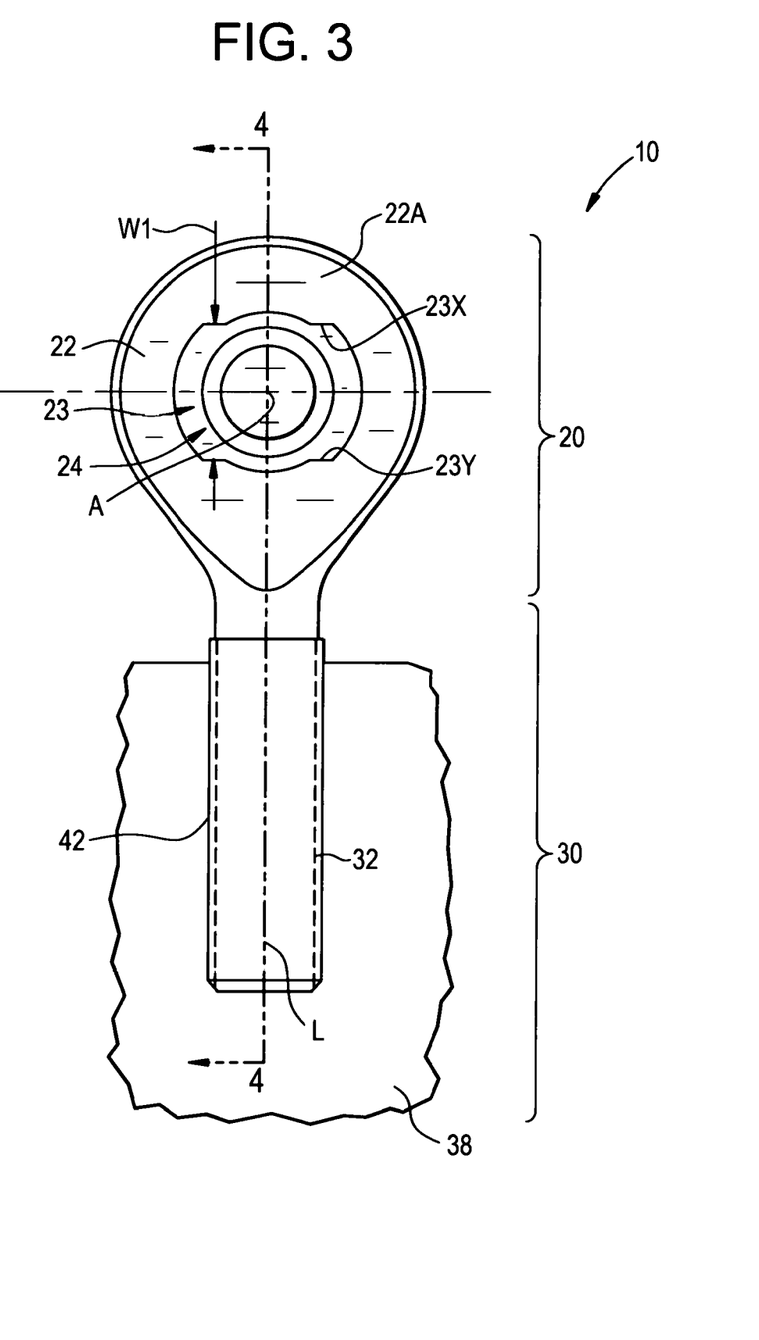
FIG. 3 is a side view of a rod end with a loader slot spherical bearing of the present invention, therein.

As shown in FIG. 3, a rod end is generally designated by the number 10. The rod end 10 includes a loader slot bearing 20 having an annular housing 22. A shaft 30 extending from and integral with the annular housing 22 thereby forms the rod end 10. The shaft 30 has a thread area 32 (e.g., male threads) for threading the rod end 10 into a female thread 42 of a support frame 38. While the shaft 30 is shown secured to the support frame 38 via the threaded area 32 and the female threads 42, the present invention is not limited in this regard as the shaft 30 may be integral with the support frame 38 or secured to the support frame with one or more alternative fasteners such as a shaft with female threads threaded on to a male threaded pin extending from the support frame 38, a flanged connection or welded to the support frame.

Figure 4:
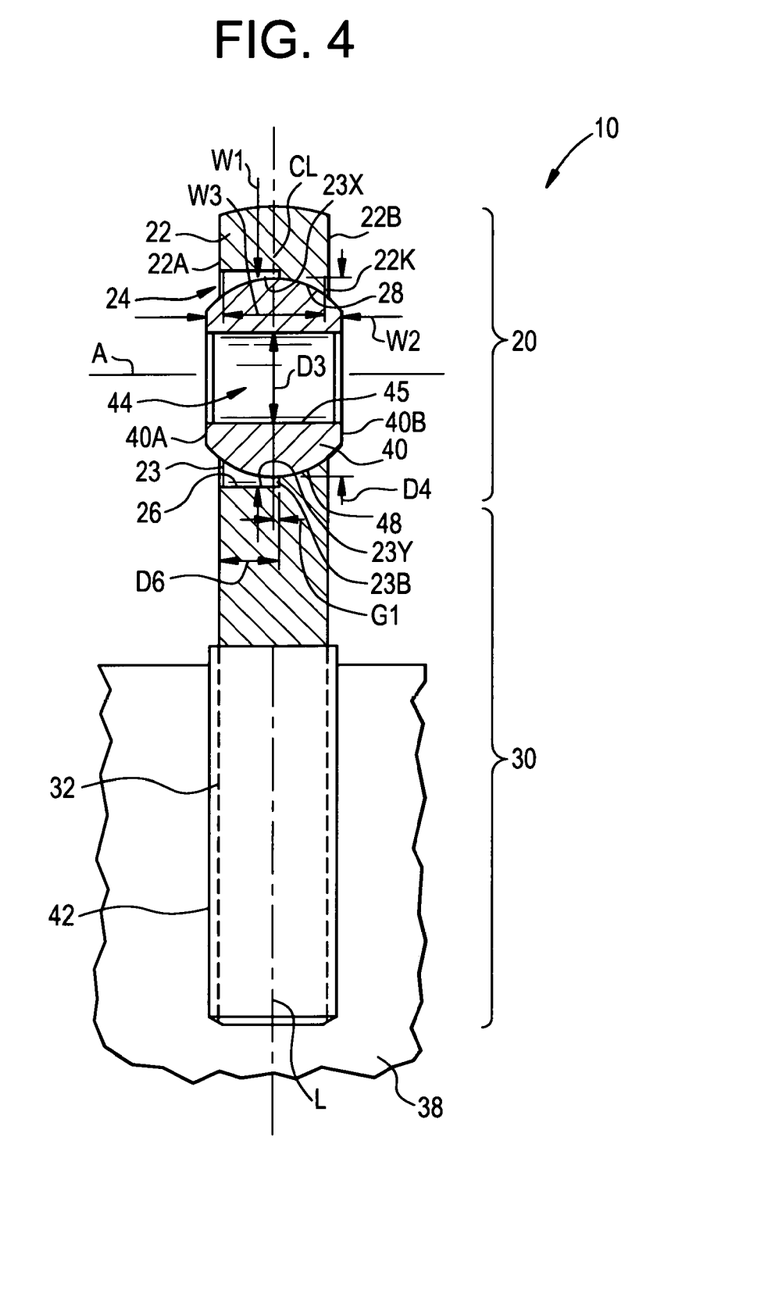
FIG. 4 is a cross sectional view of the rod end and loader slot bearing of FIG. 3, taken across section 4-4 of FIG. 3.
Figure 8:
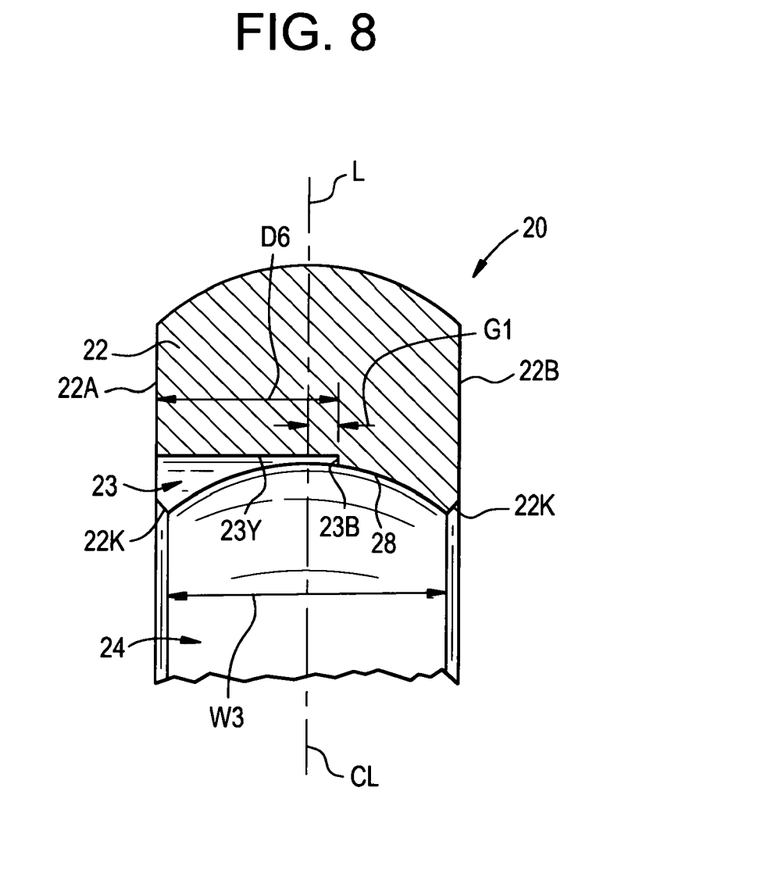
FIG. 8 is an enlarged view of a portion of the rod end of FIG. 4 shown without the truncated ball to illustrate a drop in configuration.

As shown in FIGS. 3 and 4, the annular housing 22 has a first axial surface 22A, a second axial surface 22B and an interior area 24 extending between the first axial surface 22A and the second axial surface 22B. In one embodiment, each of the first axial surface 22A and the second axial surface 22B have a chamfer 22K formed on a radially inner most portion thereof. The interior area 24 is defined by a first inner surface 26 that extends between the first axial surface 22A and the second axial surface 22B. A portion of the inner surface 26 is a first bearing surface 28 having a spherical contour. As shown in FIGS. 3 and 8, the first bearing surface 28 has an effective width W3 that extends between respective axial inward portions of the chamfers 22K of the first axial surface 22A and the second axial surface 22B. As best shown in FIG. 8 the slot 23 extends partially and axially (i.e., parallel to a central axis A) into the first inner surface 26 from the first axial surface 22A. As shown in FIGS. 3 and 4, the slot 23 has a first width W1 extending parallel to a longitudinal axis L of the rod end 10. The slot 23 defines opposing longitudinally inward facing walls 23X and 23Y.

Figure 5:
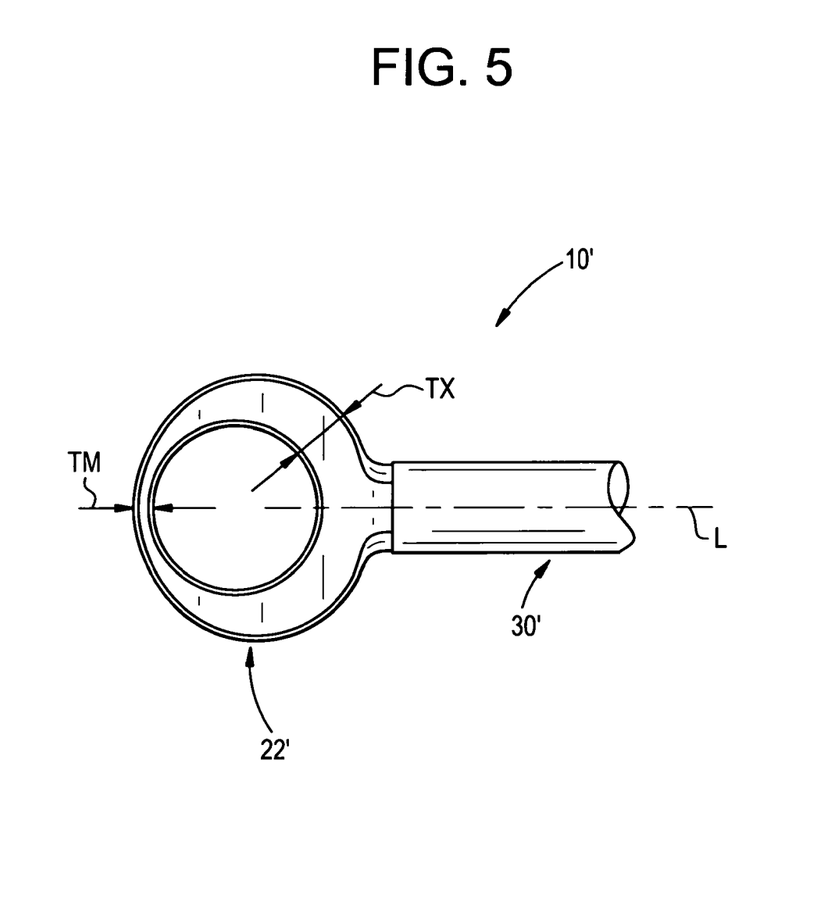
FIG. 5 is another embodiment of the rod end of the present invention having an asymmetric head.

In one embodiment, a rod end 10' with an asymmetric head, as shown in FIG. 5, may be employed. The rod end 10' has a housing 22' that has a minimum wall thickness TM at a distal end thereof and has a variable thickness TX that progressively increases towards the shaft 30'.

As shown in FIGS. 3 and 4, the loader slot bearing 20 includes a truncated ball 40 (e.g., a standard size SAE ball such as that used in a AS14101 through AS14104 spherical bearing) that has a spherical exterior surface 48 extending a second width W2 extending axially (i.e., parallel to the central axis A) between a third axial surface 40A and a fourth axial surface 40B. The second width W2 is less than the first width W1 so that the truncated ball 40 is initially slid into the slot 23 and positioned in the slot 23 so that the third axial surface 40A and the fourth axial surface 40B and the inward facing walls 23X and 23Y are parallel to one another. The truncated ball 40 is rotated so that the truncated ball 40 is retained by the first bearing surface 28, the truncated ball 40 is angularly misalignable relative to the housing 22.

Figure 9:
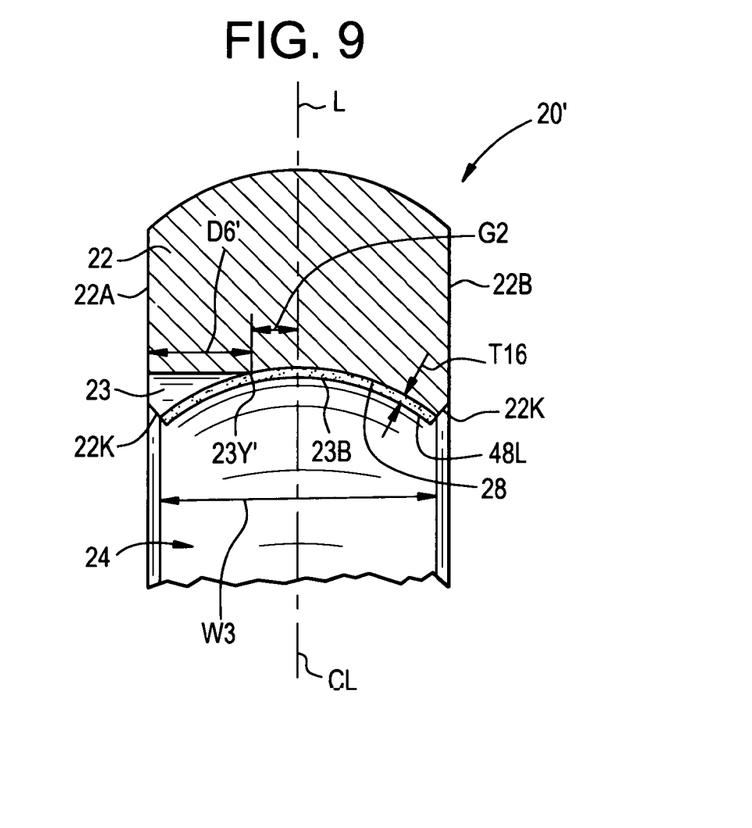
FIG. 9 is an enlarged view of a portion of the rod end of FIG. 7 shown without the truncated ball to illustrate a force fit configuration.
Figure 10:
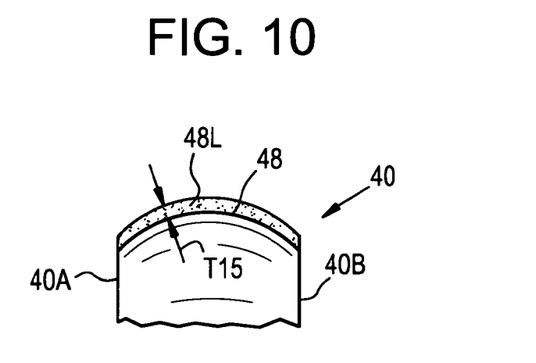
FIG. 10 is a cross sectional view of a portion of the ball of the loader slot bearing of the present invention.

As shown in FIG. 10, a dry lubricant 48L is applied to or disposed on (e.g., applied as a powder, dusting, spraying or thin film which typically requires an abrasive blast of the surface, chemical cleaning, possible phosphate conversion coating, followed by another chemical cleaning, prior to the dry film compound applied to the spherical exterior surface 48 of the truncated ball 40. In one embodiment, the dry lubricant 48L is a molybdenum disulfide material in a binder (e.g.,), such as Everlube® 732 or Everlube® 967 (Everlube is a registered trademark of Everlube Corporation of America), Tungsten disulfide solid film lubricants such as DICRONITE® DL-5 (DICRONITE is a registered trademark of Lubrication Sciences Corporation of 152 N. THIRD STREET, SUITE 550 SAN JOSE, Calif., 95112) or MICROSEAL® 300-1 (MICROSEAL is a registered trademark of Metal Improvement Company, LLC of 80 Route 4 East Paramus, N.J., 07652). Further examples of dry lubricants 48L that are applied to the spherical exterior surface 48 of the truncated ball 40 and that do not readily rub off are XYLAN® PTFE based and PTFE/Molybdenum disulfide based solid film lubricants (also called dry films), such as XYLAN® 1010 or XYLAN® 1052 (XYLAN is a registered trademark of Whitford Corporation of P.O. BOX 2347 West Chester, Pa., 19380). XYLAN® PTFE based and Molybdenum disulfide based solid film lubricants are hard type dry lubricants 48L as defined by the fact some dry film binders are less dense, and powdery, readily rubbing off with finger pressure, while others, like the polyimide binder dry lubes are more dense, not rubbing off as easily, resisting water and wear under motion, better than epoxy, phenolic, sodium silicate, etc. Other, less hard, dry lubes using Molybdenum disulfide and Molydenum Disulfide-graphite or straight graphite based lubricants with phenolic, epoxy, silicate, solvent based or water based binders may be used. In one embodiment, the dry film lubricants 48L EVERLUBE® 620, EVERLUBE® 620C, ESNALUBE® 382, EVERLUBE® 811, EVERLUBE® 823, PERMA-SLIK® G, EVERLUBE 9001, LUBE-LOK® 7100, LUBE-LOK® 7400 (EVERLUBE, ESNALUBE, PERMA-SLIK, and LUBE-LOK are registered trademarks of Metal Improvement Company, LLC DELAWARE 80 Route 4, East Paramus, N.J. 07652) are applied to the spherical exterior surface 48 of the truncated ball 40. The dry lubricant 48L facilitates direct sliding engagement of the spherical exterior surface 48 of the truncated ball 40 with the first bearing surface 28 of the housing 22. In one embodiment, the dry lubricant 48L is of a maximum thickness T15 of 0.0127 mm (0.0005 inches), preferably 0.00508 to 0.0127 mm (0.0002 to 0.0005) inches thick. While the dry lubricant 48L is described as being applied to the spherical exterior surface 48 of the truncated ball 40, the present invention is not limited in this regard, as the dry lubricant 48L may be applied to the first bearing surface 28 of the housing 22 (see FIG. 9) as an alternative to, or in addition to, the application of the dry lubricant 48L to the spherical exterior surface 48 of the truncated ball 40. The dry lubricant 48L applied to or disposed on (e.g., (e.g., applied as a powder, dusting, spraying or thin film) the first bearing surface 28 of the housing 22 has a thickness T16 that is about equal to the thickness T15. In addition to providing lubrication and lowering friction, the dry film lubricants 48L also offer some corrosion resistance, similar to paint.

Unlike prior art loader slot bearings, the first bearing surface 28 of the housing 22 is not malcomized. Thus, the first bearing surface 28 has a hardness of HRC 28-37 (condition H1150, 17-4PH per AMS 5643 or 15-5PH per AMS5659), which is a lower hardness (i.e., is softer) than a malcomized or nitrided case harden surface, which typically have a hardness in excess of HRC 64. A Stellite® 6 ball or Cobalt 6 ball per AMS5387, investment cast, has a hardness of HRC 36 as cast. The prior art loader slot bearing has a ball softer than the hard malcomized case hardened surface, which leads to ball brinnelling after being subject to high loading. The 17-4PH loader slot housing 22 with no malcomized treatment, at a hardness of HRC 28-37 will not brinnell a 440C AMS5630 (or AMS5618 or AMS5880) ball heat treated to a hardness of HRC55-62. The first bearing surface 28 and the housing 22 are soft enough to absorb impact loads more readily than the hard malcomized surface of the prior art bearings. Thus, the first bearing surface 28 and the housing 22 are a dampening feature that function as shock absorber that dampens impact loads received by the loader slot bearing 10.

The annular housing 22 and the shaft 30 are manufactured (e.g., machined from a bar stock or casting) from a precipitation hardened corrosion resistant stainless steel such as 17-4PH stainless steel pursuant to AMS 5643 or 15-5PH stainless steel pursuant to AMS5659. In one embodiment, the 17-4PH stainless steel is in a condition H1150 heat treatment. In one embodiment, the precipitation hardened corrosion resistant stainless steel has a surface hardness of 28 to 37 Rockwell C (i.e., HRC 28-37). The truncated ball 40 is manufactured from a 440C stainless steel per AMS 5630. In one embodiment, the truncated ball 40 has a surface hardness of 55 to 62 Rockwell C (i.e., HRC 55-62). In one embodiment, the annular housing 22, the shaft 30 and/or the truncated ball 40 are heat treated pursuant to MAS H-6875 or AMS 2559, which are incorporated herein by reference.

Figure 6:
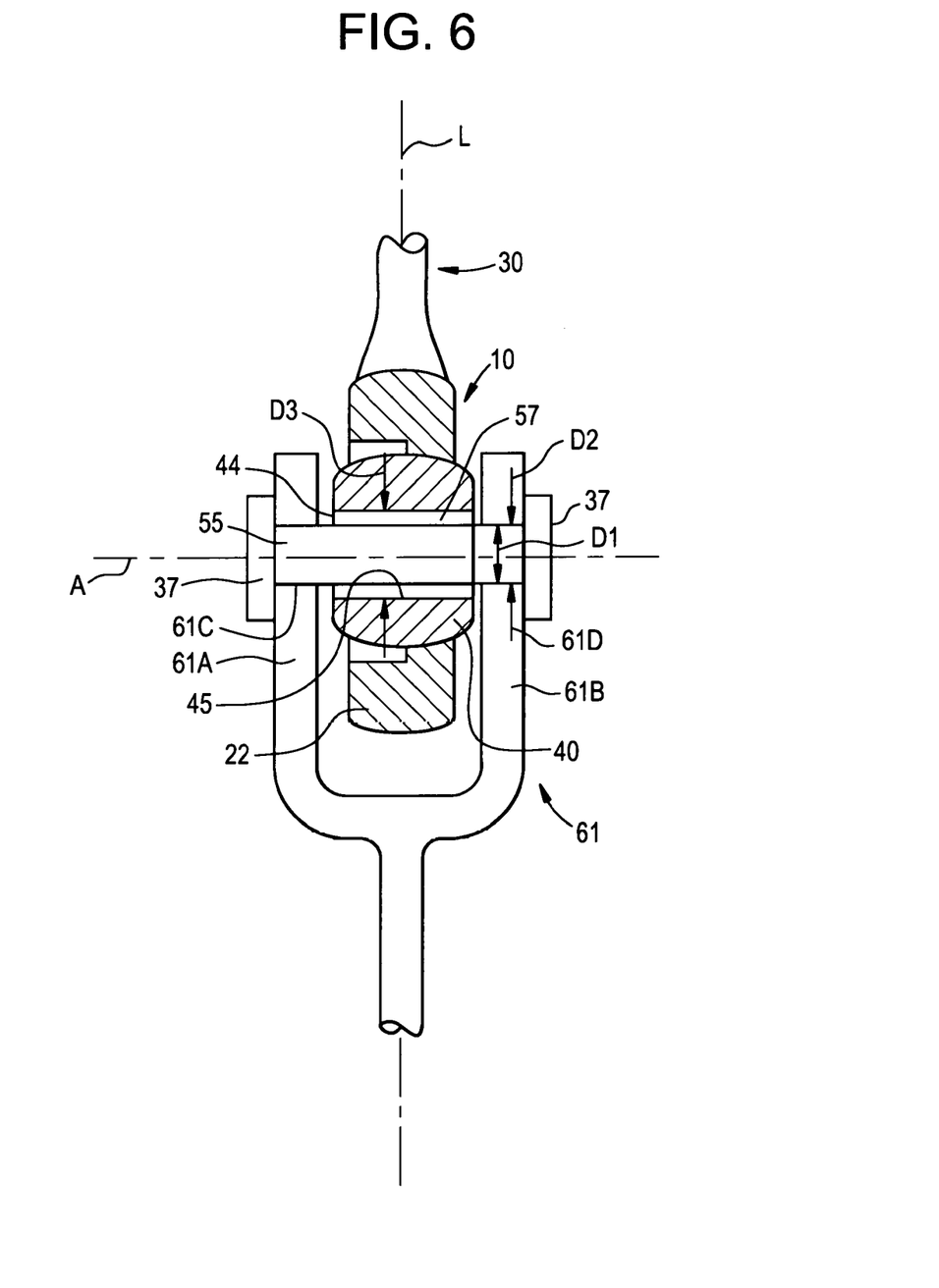
FIG. 6 is a front view of a portion of the rod end of the present shown installed in a clevis.

As shown in FIG. 4, the truncated ball 40 has a cylindrical bore 44 extending between the third axial surface 40A and the fourth axial surface 40B. The bore 44 is defined by a second inner surface 45. As shown in FIG. 6, a pin 55 (e.g., a solid metallic material such as a stainless steel or a dowel pin made from NADM16555 or equivalent) having a cylindrical exterior surface 57 extends through the cylindrical bore 44. The truncated ball 40 is axially rotatable relative to the pin 55 when frictional forces between the second inner surface 45 and the cylindrical exterior surface 57 is below a threshold level. When the frictional forces exceed the threshold level, the pin 55 and truncated ball 40 lock together and are axially rotatable together, relative to the housing 22. The housing 22 and the truncated ball 40 are configured to move relative to one another and withstand accelerations of up to about 4G. The housing 22, the truncated ball 40 and the pin 55 are configured to move relative to one another and withstand accelerations of up to about 4G. In one embodiment, the term withstand means that the truncated ball 40 continues to be retained by the first bearing surface 28 and/or the truncated ball 40 continues to be angularly misalignable relative to the housing 22, during and/or after being subject to the accelerations of up to about 4G. In one embodiment, the term withstand means that the dry lubricant 48L remains on the spherical exterior surface 48 of the truncated ball 40 during and/or after being subject to the accelerations of up to about 4G. In one embodiment, the term withstand means that the truncated ball 40 and/or housing 22 are not damaged, for example, cracked, brinnelled, scored and/or scratched as a result of being subject to the accelerations of up to about 4G.

As shown in FIG. 6, the cylindrical exterior surface 57 of the pin 55 defines a first outside diameter D1. The bore 44 of the truncated ball 40 has a first inside diameter D3 that is at least 0.0019 inches greater than the first outside diameter D1 of the pin 55 to define a loose fit between the truncated ball 40 and the pin 55 compared to typical aerospace industry standards for rod end testing, such as AS81935, which defines pin to ball clearance of 0.0254 mm (0.001 inch) maximum. In one embodiment, the ball 40 and pin 55 and casing 22 are per military standard for plain self-aligning bearings MS14101-3 spherical bearing and with the pin 55 having a 3/16 inch outside diameter create a loading condition with great pin bending relative to pure shear, compared to a standard AS81935 rod end test with a tighter fitting pin.

As shown in FIG. 6, the rod end 10 is pivotally connected to a clevis 61 via the pin 55 extending through respective apertures 61C and 61D of arms 61A and 61B of the clevis

61. The apertures 61C and 61D have a second inside diameter D2 that is less than the outside diameter D1 of the pin 55 so that the pin 55 is press fit (i.e., interference fit) into the apertures 61C and 61D. In one embodiment, a cap 37 is secured to opposing ends of the pin 55 to further limit axial movement of the pin 55 relative to the clevis 61. In one embodiment, the clevis 61 is integrally machined into the surface of a device being deployed. However, the clevis 61 can be secured to the surface of the device being deployed by welding, adhesives or one or more mechanical fasteners.

The loader slot bearing 10 is scalable for use with various sized devices to be deployed. For example, the spherical exterior surface 48 of the truncated ball 40 is defined by a second outside diameter D4 (depicted in FIG. 9). The housing defines a third width W3 between the first axial surface 22A and the second axial surface 22B. A ratio of the third width W3 to the second outside diameter D4 is about 0.35 to 0.50.

As shown in FIGS. 4 and 8, the loader slot bearing 20 is configured so the truncated ball 40 can be dropped into the slot 23 so that a portion of the spherical exterior surface 48 (i.e., a portion extending continuously between the third axial surface 40A and fourth axial surface 40B) is in engagement with a corresponding portion of the first bearing surface 28. This so-called drop in configuration is enabled by the depth D6 of the slot 23 extending axially into (see depth differential G1) the housing 22 to the depth D6 that extends further than a centerline CL (coaxial with the longitudinal axis L) of the truncated ball 40 by the depth differential G1 of about 0.127 mm (0.005 inches) or greater, while the width W1 is greater than the outside diameter D4 of the truncated ball 40, at the longitudinal axis L. A manufacturing option is producing the entry slot via conventional end milling that broaches the entry slot configuration completely through the rod end faces, producing an entry slot that permits ball installation and removal on either side.

Figure 7:
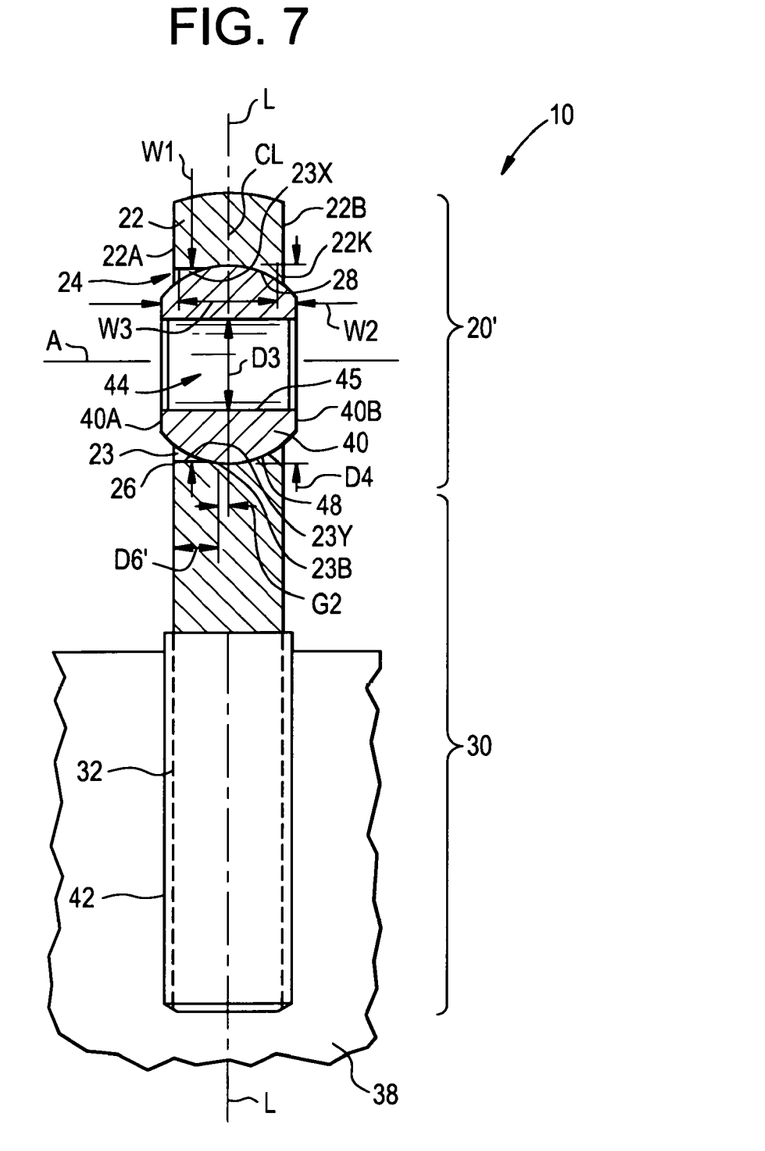
FIG. 7 is a cross sectional view of another embodiment of the rod end of FIG. 4.

While FIG. 4 shows the drop-in configuration, the present invention is not limited in this regard as a forced-fit type loader slot bearing 20' may be employed as shown in FIGS. 7 and 9. As shown in FIGS. 7 and 9, the loader slot bearing 20' is configured so the truncated ball 40 can be in a forced fit configuration in the slot 23 so that a portion of the spherical exterior surface 48 (i.e., a portion extending continuously between the third axial surface 40A and fourth axial surface 40B) is in engagement with a corresponding portion of the first bearing surface 28. This so-called forced fit configuration is enabled by the depth D6 of the slot 23 extending axially into (see depth differential G2) the housing 22 to a depth D6' that does not intersect the centerline CL (coaxial with the longitudinal axis L) of the truncated ball 40, while the width W1 is greater than the outside diameter D4 of the truncated ball 40, at the longitudinal axis L. In FIG. 9, the depth differential G2 is shown exaggerated for clarity of illustration. In one embodiment the depth differential G2 is between 0.127 and 0.0254 mm (0.005 and 0.001 inches) to create the forced fit configuration while allowing the truncated ball 40 to be forced into the housing 22, without damaging the truncated ball 40 or housing 22. In the forced fit configuration of FIGS. 7 and 9, portions of the first bearing surface 28 elastically deform to allow the truncated ball 40 to enter the interior area 24 of the housing 22.

While the present disclosure has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A loader slot bearing comprising:
   an annular housing having a first axial surface, a second axial surface and an interior area extending between the first axial surface and the second axial surface, the interior area being defined by a first inner surface that extends between the first axial surface and the second axial surface, a portion of the first inner surface being a first bearing surface having a spherical contour and a first surface hardness of 28 to 37 Rockwell C (HRC 28-37), a slot extending partially into the first inner surface from the first axial surface, the slot having a first width extending in a direction parallel to the first axial surface, and the annular housing being manufactured from a precipitation hardened corrosion resistant stainless steel;
   a truncated ball having a spherical exterior surface extending a second width between a third axial surface and a fourth axial surface, the second width being less than the first width, the truncated ball being positioned in the slot and rotated so that the truncated ball is rotatably retained by the first bearing surface, the truncated ball being angularly misalignable relative to the housing, the truncated ball being manufactured from a 440C stainless steel per AMS 5630, the spherical exterior surface of the truncated ball having a second surface hardness of 55 to 62 Rockwell C (HRC 55-62); and
   a dry lubricant applied to the spherical exterior surface.

2. The loader slot bearing of claim 1, wherein the precipitation hardened corrosion resistant stainless steel is 17-4PH stainless steel pursuant to AMS 5643.

3. The loader slot bearing of claim 2, wherein the 17-4PH stainless steel is in a condition H1150 heat treatment.

4. The loader slot bearing of claim 1, wherein the precipitation hardened corrosion resistant stainless steel is 15-5PH stainless steel pursuant to AMS5659.

5. The loader slot bearing of claim 1, wherein the truncated ball has a cylindrical bore extending between the third axial surface and the fourth axial surface, the bore being defined by a second inner surface; and
   a pin having a cylindrical exterior surface, the pin extending through the cylindrical bore and the truncated ball being rotatable relative to the pin when frictional forces between the second inner surface and the cylindrical exterior surface is below a threshold level; and
   wherein when the frictional forces exceed the threshold level, the pin and truncated ball lock together and are rotatable together, relative to the housing.

6. The loader slot bearing of claim 5, wherein the pin is solid.

7. The loader slot bearing of claim 5, wherein the cylindrical exterior surface defines a first outside diameter and the bore of the truncated ball has a first inside diameter that is at least 0.00254 to 0.04826 mm greater than the first outside diameter.

8. The loader slot bearing of claim 5, further comprising a shaft extending from and integral with the annular housing thereby forming a rod end, and wherein:

the first bearing surface and the housing are a dampening feature to dampen impact loads received by the loader slot bearing, the truncated ball having the hardness of HRC 55-62 is retained by the first bearing surface having the hardness of HRC 28-37, and the housing, the truncated ball and the pin move relative to one another, wherein when accelerations or impact loads during mechanism deployment are up to about 4G, the truncated ball continues to be retained by the first bearing surface.

9. The loader slot bearing of claim 8, wherein the shaft is integral with a support frame or is secured to the support frame with at least one fastener.

10. The loader slot bearing of claim 1, wherein the dry lubricant comprises a molybdenum disulfide material in a binder.

11. The loader slot bearing of claim 1, wherein the dry lubricant is of a maximum thickness of 0.0127 mm.

12. The loader slot bearing of claim 1, wherein the spherical exterior surface of the truncated ball is defined by an outside diameter, the housing defines a third width between the first axial surface and the second axial surface and wherein a ratio of the third width to the outside diameter is about 0.35 to 0.50.

13. The loader slot bearing of claim 1, further comprising a shaft extending from and integral with the annular housing thereby forming a rod end, and wherein:

the first bearing surface and the housing are a dampening feature to dampen impact loads received by the loader slot bearing, the truncated ball having the hardness of HRC 55-62 is retained by the first bearing surface having the hardness of HRC 28-37, and the housing and the truncated ball move relative to one another, wherein when accelerations or impact loads during mechanism deployment are up to about 4G, the truncated ball continues to be retained by the first bearing surface.

14. The loader slot bearing of claim 13, wherein the shaft is integral with a support frame or is secured to the support frame with at least one fastener.

15. The loader slot bearing of claim 1, wherein the loader slot bearing is manufactured from a bar stock or cast form of the precipitation hardened corrosion resistant stainless steel.

16. The loader slot bearing of claim 1, wherein the truncated ball is dropped in or forced fit in to the interior area of the housing.

17. The loader slot bearing of claim 1, wherein the slot is milled or broached all the way through the housing and the truncated ball is dropped in to the interior area of the housing through the slot.

* * * * *